(12) United States Patent
Lotha

(10) Patent No.: US 7,598,472 B2
(45) Date of Patent: Oct. 6, 2009

(54) DEVICE FOR COOLING WELDING CAPS

(75) Inventor: Hartmuth Lotha, Kuenzelsau (DE)

(73) Assignee: Burkert Werke GmbH & Co. KG, Ingelfingen (DE)

( * ) Notice: Subject to any disclaimer, the term of this patent is extended or adjusted under 35 U.S.C. 154(b) by 602 days.

(21) Appl. No.: 11/340,901

(22) Filed: Jan. 27, 2006

(65) Prior Publication Data

US 2006/0175379 A1   Aug. 10, 2006

(30) Foreign Application Priority Data

Feb. 3, 2005  (DE)  ................ 20 2005 001 738 U

(51) Int. Cl.
  *B23K 11/30*  (2006.01)
(52) U.S. Cl. ...................................... 219/120
(58) Field of Classification Search ................ 219/120
  See application file for complete search history.

(56) References Cited

U.S. PATENT DOCUMENTS 4,742,841 A * 5/1988 Vonderhaar et al. ..... 137/115.21

4,788,407 A * 11/1988 Flater .......................... 219/120
5,378,868 A * 1/1995 Burkhardt et al. ............. 219/89
5,473,135 A * 12/1995 Shimada ...................... 219/120

FOREIGN PATENT DOCUMENTS

| DE | 31 39 376 A1 | 4/1983 |
| DE | 34 16 733 C1 | 11/1985 |
| EP | 0 433 586 A | 6/1991 |
| EP | 1 224 996 A2 | 7/2002 |
| EP | 1 484 557 A | 12/2004 |
| JP | 61 071190 | 4/1986 |
| JP | 11 058029 | 3/1999 |

* cited by examiner

*Primary Examiner*—Kevin P Kerns
(74) *Attorney, Agent, or Firm*—Stuart J. Friedman

(57) ABSTRACT

A device for cooling welding caps of a welding apparatus includes a cooling line (10). A cooling agent is kept under pressure during removal of the welding caps. An expansion device (16) including an expansion chamber (34) is connected to the cooling line (10).

12 Claims, 2 Drawing Sheets

DEVICE FOR COOLING WELDING CAPS

TECHNICAL FIELD

The invention relates to a device for cooling welding caps of a welding apparatus.

BACKGROUND OF THE INVENTION

In robotic welding technology, there are used welding tongs with replaceable welding caps. The wear of the welding caps can be noticeably retarded by a good cooling. For this purpose cooling systems are provided which include cooling lines. In the cooling lines water is used as a cooling agent, to which glycol and further additives have been added, for instance. During replacement of the welding caps the cooling line is automatically sealed up in the region of the welding caps in order to prevent any escape of the pressurized cooling agent. As it is not possible to immediately seal up the cooling line despite the use of quick-acting stop valves, an undesired squirting of cooling agent will occur due to the pressure which continues to be present in the sealed-up portion of the cooling line.

European Patent Application EP 0 433 586 A shows a device for cooling welding caps of a welding apparatus comprising an exhaust system. Part of the cooling line is shut and completely discharged. This technique is disadvantageous because upon refill it is unavoidable that undesired air gets into the cooling line.

It is an object of the invention to provide a device for cooling welding caps, which avoids a loss of cooling agent to a large extent.

BRIEF SUMMARY OF THE INVENTION

According to the invention, a device for cooling welding caps of a welding apparatus comprises a cooling line in which a cooling agent is kept under pressure during removal of the welding caps. The device further comprises an expansion device connected to the cooling pipe, the expansion device including an expansion chamber. The invention is based on the finding that the squirting of cooling agent when closing the valves is caused by the high pressure in the cooling pipe. During a replacement of the welding caps, the expansion chamber therefore provides the possibility of an immediate pressure reduction so that no highly pressurized cooling agent can escape. Compared with cooling devices which shut and discharge a part of the cooling line, the device according to the invention works according to a different principle. By its expansion the expansion chamber provides for a pressure equalization. The expansion chamber only gets filled until the overpressure is relieved. The cooling line remains filled with cooling agent.

In the preferred embodiment of the invention the expansion chamber is in direct flow connection with the cooling agent, i.e. the cooling agent can be relieved from pressure directly by flowing into the expansion chamber.

It is preferred that the expansion chamber is provided in a housing and is delimited by a face associated to a piston which is movable in the housing. Thus, the volume of the expansion chamber can be easily expanded by a displacement of the piston.

In order to dampen the movement of the piston in the expansion direction, the piston is adapted to be acted upon with a back pressure.

For adjusting the back pressure to the specific conditions, in particular to the volume which is enclosed in the sealed-up cooling line portion, preferably a pneumatic pilot valve and a pressure limiting device for adjusting the back pressure are provided. Standard components may be used for the pilot valve and the pressure limiting device.

A piston with a seal separating the expansion chamber on side of the piston from a back pressure chamber arranged on the other side of the piston has proven to be of particular advantage. With this, the pneumatic section of the device (pilot valve, pressure limiting device, back pressure chamber) is kept separate from the fluidic section of the device (cooling line, expansion chamber) and a mixing of the two media will not occur.

A further development of the invention provides for that the piston is sealed up with respect to the housing by at least two surrounding, axially spaced seals. An intermediate space is formed between the two seals, the housing having an aperture in the region of the intermediate space. This special construction permits a check of the sealing between the pneumatic and fluidic sections of the device. In case there is a leakage at the seal facing the fluidic section, for instance, cooling agent would enter the intermediate space and exit through the aperture. In the other case, i.e. if the seal facing the pneumatic section has a defect, then it would be air which escapes through the aperture. Thus, by connecting a suitable detector to the aperture it is possible to continuously monitor the seal.

DETAILED DESCRIPTION OF THE PREFERRED EMBODIMENT

Figure 1:
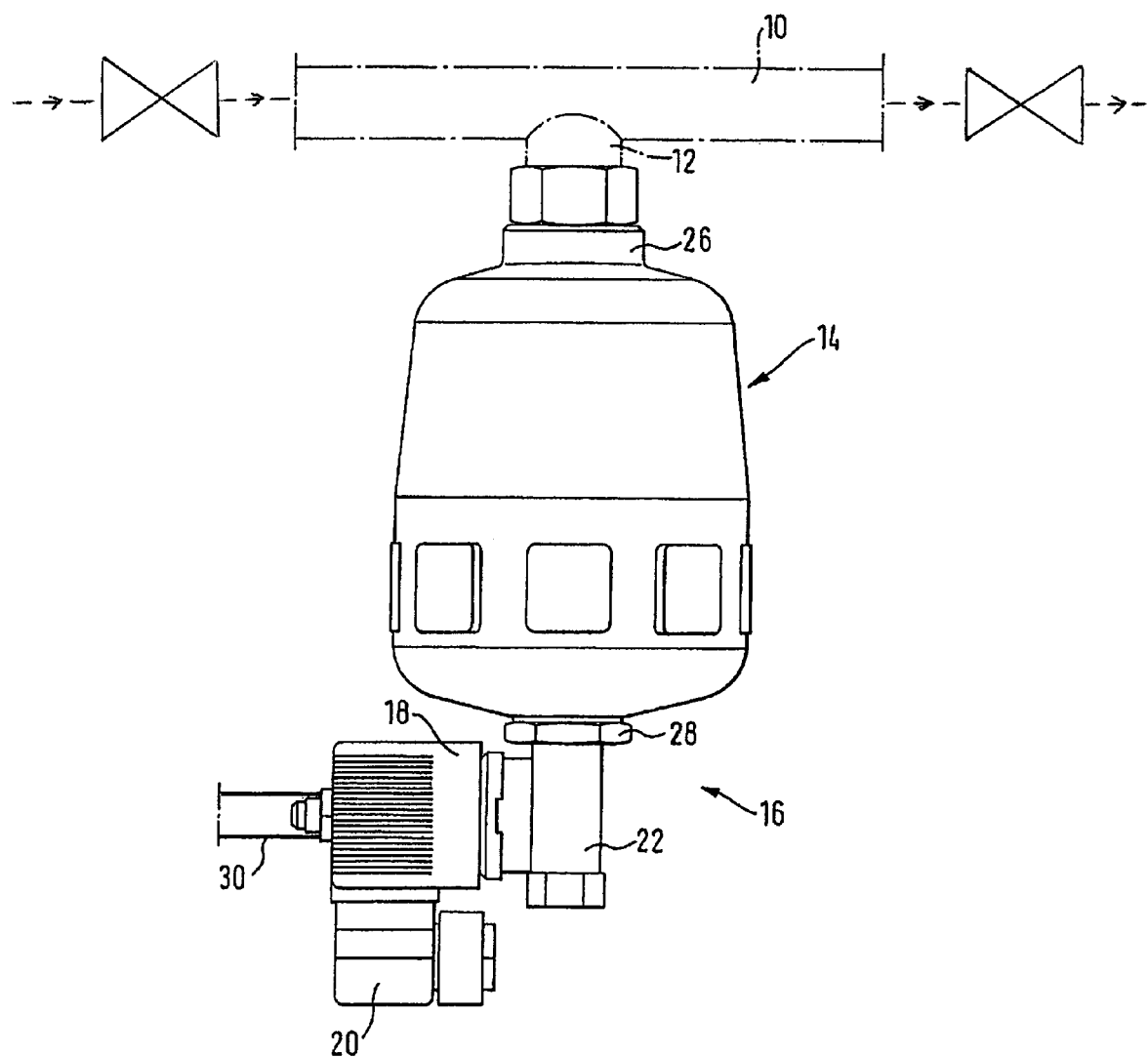
FIG. 1 is a side view of a device according to the invention.

FIG. 1 illustrates a cooling line 10 of a cooling system for the welding caps of a robotic welding tong. The cooling line 10 has a downwardly pointing screw thread connection 12 to which an expansion cylinder 14 is screwed. The expansion cylinder 14 is part of an expansion device 16. The expansion device further includes a pilot valve 18 which is designed as a solenoid valve and has a female connector 20, as well as a pressure limiting device in the form of a restrictor 22. The restrictor 22 can be integrated in the pilot valve 18, like in the illustrated embodiment.

Figure 2:
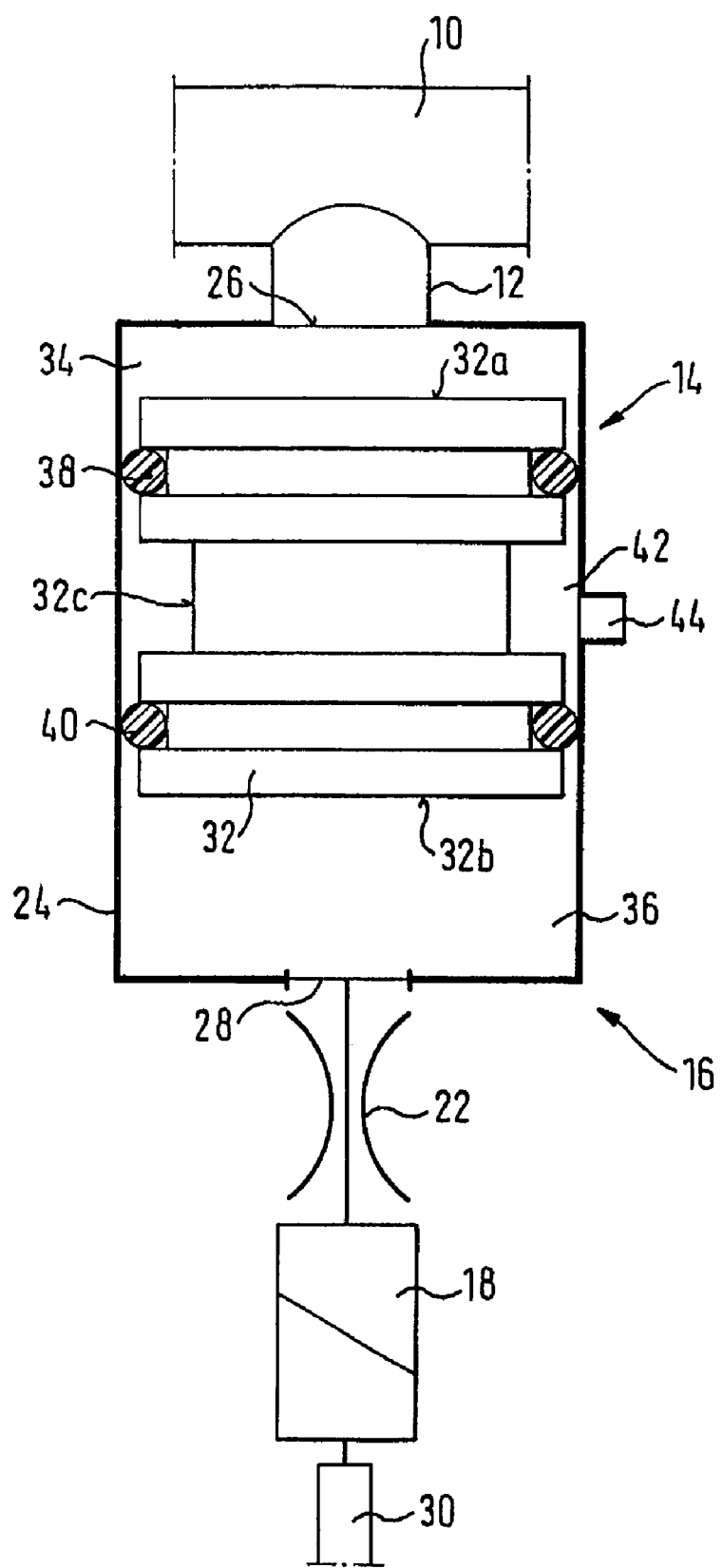
FIG. 2 is a basic block diagram of the device of FIG. 1.

The basic construction of the expansion device 16 will be apparent in particular from FIG. 2. The expansion cylinder 14 has an essentially cylindrical housing 24 with two connections 26, 28 at the end faces. The first connection 26 is connected with the cooling line 10, and the second connection 28 is connected with the restrictor 22. The pilot valve 18 is connected to a compressed air pipe 30 and is driven electrically.

The interior of the expansion cylinder 14 is divided into an expansion chamber 34 and a back pressure chamber 36 by an axially movable piston 32. At their sides facing each other, the two chambers 34, 36 are delimited by the axially movable end faces 32a and 32b of the piston 32, respectively. Towards the housing 24, the piston 32 is sealed up by two seal rings 38, 40 so that the pneumatic section of the expansion device 16 underneath the seal 40 is separated from the fluidic section of the expansion device above the seal 38.

The piston has a neck 32c formed between the two seals 38, 40, whereby an annular intermediate space 42 is formed. The position of the intermediate space 42 varies with the movement of the piston 32. Towards outside, the intermediate space 42 is limited by the wall of the housing 24, with a housing aperture 44 (only shown in FIG. 2) being provided in the region of the intermediate space. 42. The axial dimension of the intermediate space 42 and the arrangement of the housing aperture 44 are chosen such that the housing aperture 44 is in flow connection with the intermediate space 42 in any piston position which is possible, during normal use of the expansion device.

The functioning of the device according to the invention will be explained in the following. During a replacement of the welding caps of the robotic welding tong, the cooling line 10 is automatically sealed up by quick-acting stop valves. Thereby the cooling agent in the cooling line 10 is enclosed under pressure. The pressure, however, will be reduced immediately because the cooling agent can flow into the expansion chamber 34 of the expansion cylinder 14 and move the piston 32 under enlargement of the expansion chamber 34. The pressure in the back pressure chamber 36, which is adjusted by means of the pilot valve 18 and the restrictor 22, is chosen such that the movement of the piston will be damped at a suitable rate. It is due to the immediate pressure reduction that a squirting of cooling agent in the region of the quick-acting stop valves will not occur.

After having replaced the welding caps, the piston 32 will be displaced again towards the cooling line 10, in fact by the back pressure which is made available by the pressure pipe 30 and is suitably adjusted by the pilot valve 18 and the restrictor 22. Thereby the expansion chamber 34 becomes smaller again and is able to expand anew during a further weld cap replacement.

A particular advantage of the described device is the isolation of media, i.e. the compressed air for providing the back pressure for the piston 32 does not mix with the cooling agent during use of the device.

In order to ensure a failure-free operation of the device according to the invention, the expansion cylinder 14 is disposed underneath the cooling line 10 and arranged so as to stand upright.

The housing aperture 44, which is in flow connection with the intermediate space 42, serves for a checking of the seals 38, 40. In case a seal 38 does not work properly, cooling agent enters the intermediate space 42 and escapes from it through the housing aperture 44. Thus, the determination of such an escape of cooling agent is a direct evidence of a leakage of the seal 38. On the other hand, any escape of compressed air is a sign of a defect seal 40. In both cases, however, it is not necessary to immediately replace the seals when the medium escaped from the housing aperture 44 is retained, because the other seal normally is still intact and can perform the sealing function on its own.

The invention claimed is:

1. A device for cooling welding caps of a welding apparatus, comprising:
   a cooling line adapted for having a cooling agent flowing therein;
   an expansion device connected to and in fluid flow communication with said cooling line, said expansion device including an expansion chamber, said expansion chamber being completely sealed except for the fluid flow connection to said cooling line;
   means in said cooling line for automatically sealing said cooling agent under pressure in said cooling line when said welding caps are removed for replacement;
   said expansion chamber including means for allowing cooling agent to flow therein from said cooling line for reducing pressure in said cooling line, said expansion chamber housing cooling agent therein when said means in said cooling line automatically seals said cooling agent in said cooling line;
   whereby the pressure in said cooling line is automatically reduced by said cooling agent flowing into said expansion chamber of said expansion device.

2. The device according to claim 1, wherein the expansion chamber is provided in a housing and is delimited by a face associated to a piston, the piston being movable in the housing.

3. The device according to claim 2, further including means for applying back pressure to the piston.

4. The device according to claim 3 further comprising a control unit to control the back pressure acting on the piston for counteracting the pressure exerted by the cooling agent on said face of said piston.

5. The device according to claim 4, wherein the back pressure is the only actuating variable to control the piston.

6. The device according to claim 3, further comprising a pneumatic pilot valve and a pressure limiting device for adjusting the back pressure.

7. The device according to claim 2, wherein the piston comprises a seal separating the expansion chamber on one side of the piston from a back pressure chamber arranged on the other side of the piston.

8. The device according to claim 7, wherein the piston is sealed up with respect to the housing by at least two surrounding, axially spaced seals, an intermediate space being formed between the two seals, the housing having an aperture in the region of the intermediate space, said aperture being in flow connection with said intermediate space in all piston positions.

9. The device according to claim 1, wherein the expansion chamber is arranged underneath the cooling line in the installed state of the expansion device.

10. A method for removing welding caps of a welding apparatus comprising a cooling line, a cooling agent flowing in said cooling line, and an expansion device including an expansion chamber, said method comprising the steps of:
    providing a fluid flow connection between said expansion chamber and said cooling line;
    enclosing said cooling agent under pressure in said cooling line when said welding caps are to be removed;
    automatically reducing the pressure in said cooling line by flow of said enclosed cooling agent under pressure through said fluid flow connection, thereby enlarging said expansion chamber.

11. The method according to claim 10, wherein after enlarging said expansion chamber and replacing said welding caps, said expansion chamber is made smaller, thereby forcing said same cooling agent back into said cooling line.

12. The method according to claim 11, wherein the step of automatically reducing the pressure in said cooling line is accomplished by said cooling agent displacing a piston in said expansion device, and the step of making said expansion chamber smaller is accomplished by displacing said piston towards the cooling line.

* * * * *

UNITED STATES PATENT AND TRADEMARK OFFICE
CERTIFICATE OF CORRECTION

PATENT NO.       : 7,598,472 B2                                            Page 1 of 1
APPLICATION NO. : 11/340901
DATED            : October 6, 2009
INVENTOR(S)      : Hartmuth Lotha It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 740 days.

Signed and Sealed this

Twenty-eighth Day of September, 2010

David J. Kappos
*Director of the United States Patent and Trademark Office*